United States Patent
Minaba

(10) Patent No.: US 7,820,086 B2
(45) Date of Patent: Oct. 26, 2010

(54) PROCESS FOR PRODUCING RUBBER COMPOSITION, PROCESS FOR PRODUCING VULCANIZED MOLDED ARTICLE OF RUBBER COMPOSITION, AND PROCESS FOR PRODUCING VULCANIZED AND FOAMED MOLDED ARTICLE OF RUBBER COMPOSITION

(75) Inventor: Takeshi Minaba, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 571 days.

(21) Appl. No.: 11/311,185

(22) Filed: Dec. 19, 2005

(65) Prior Publication Data

US 2006/0149005 A1 Jul. 6, 2006

(30) Foreign Application Priority Data

| Jan. 4, 2005 | (JP) | 2005-000052 |
| Jan. 4, 2005 | (JP) | 2005-000053 |
| Jan. 4, 2005 | (JP) | 2005-000054 |
| Mar. 11, 2005 | (JP) | 2005-068713 |

(51) Int. Cl.
*B29D 7/00* (2006.01)

(52) U.S. Cl. ............ 264/45.9; 264/45.1; 264/109; 264/117; 264/119; 264/121; 264/299; 264/319

(58) Field of Classification Search ............ 264/109, 264/239, 45.9, 45.1, 117, 119, 121, 299, 264/319
See application file for complete search history.

(56) References Cited

U.S. PATENT DOCUMENTS

| 4,622,193 | A | | 11/1986 | Kresge et al. | |
| 5,284,681 | A | * | 2/1994 | Shinonaga et al. | 427/316 |
| 7,012,111 | B2 | * | 3/2006 | Kanemitsu et al. | 524/406 |
| 2001/0021449 | A1 | * | 9/2001 | Koshiba et al. | 428/315.7 |
| 2005/0146075 | A1 | * | 7/2005 | Yamaguchi et al. | 264/211.12 |

FOREIGN PATENT DOCUMENTS

| EP | 0 294 141 A1 | 12/1988 |
| EP | 0 755 965 A1 | 1/1997 |
| EP | 0 775 718 A2 | 5/1997 |
| JP | 7-171828 A | 7/1995 |
| JP | 11-60741 A | 3/1999 |
| JP | 2000-52335 A | 2/2000 |
| JP | 2002-332360 A | 11/2002 |
| JP | 2002-338933 A | 11/2002 |
| JP | 2003-48991 A | 2/2003 |

* cited by examiner

*Primary Examiner*—Eric Hug
*Assistant Examiner*—Jacob Thomas Minskey
(74) *Attorney, Agent, or Firm*—Panitch Schwarze Belisario & Nadel LLP

(57) ABSTRACT

A process for producing a rubber composition, which comprises the step of kneading at least (A) 100 parts by weight of a pellet containing an ethylene-α-olefin-non-conjugated diene copolymer rubber, the pellet having a covering layer comprising a thermoplastic resin, (B) 10 to 200 parts by weight of a reinforcing material, and (C) 1 to 200 parts by weight of a softener; and a process for producing a vulcanized (further foamed) molded article of the rubber composition.

2 Claims, No Drawings

PROCESS FOR PRODUCING RUBBER COMPOSITION, PROCESS FOR PRODUCING VULCANIZED MOLDED ARTICLE OF RUBBER COMPOSITION, AND PROCESS FOR PRODUCING VULCANIZED AND FOAMED MOLDED ARTICLE OF RUBBER COMPOSITION

FIELD OF THE INVENTION

The present invention relates to a process for producing a rubber composition; a process for producing a vulcanized molded article of a rubber composition; and a process for producing a vulcanized and foamed molded article of a rubber composition.

BACKGROUND OF THE INVENTION

As a pellet comprising a combination of a rubber with a thermoplastic resin, JP 2000-52335A discloses pellets comprising a blend of a rubber with a thermoplastic resin. Since said pellets do not bond easily with one another, it is easy to weigh said pellets on a scale, and then, supply them continuously to a kneading machine such as an extruder.

SUMMARY OF THE INVENTION

However, in order to produce pellets not bonding easily with one another and keeping well their pellet shape, it is necessary to blend the rubber with a large amount of the thermoplastic resin, which results in a problem that said pellets do not bring out sufficiently rubber characteristics such as flexibility and compressive permanent strain.

An object of the present invention is to provide (1) a process for producing a vulcanized molded article of a rubber composition, said article having excellent flexibility and small compressive permanent strain, (2) a process for producing a vulcanized and foamed molded article of a rubber composition, said article having excellent low-temperature characteristics, and (3) a process for producing a rubber composition using a pellet-like rubber, said composition being preferably used for the above-mentioned two processes.

The present invention is a process for producing a rubber composition, which comprises the step of kneading at least:

(A) 100 parts by weight of a pellet containing an ethylene-α-olefin-non-conjugated diene copolymer rubber, the pellet having a covering layer comprising a thermoplastic resin;

(B) 10 to 200 parts by weight of a reinforcing material; and (C) 1 to 200 parts by weight of a softener.

This process is hereinafter referred to as the process-1.

Also, the present invention is a process for producing a vulcanized molded article of a rubber composition, which comprises the steps of:

(1) kneading at least (A) 100 parts by weight of a pellet containing an ethylene-α-olefin-non-conjugated diene copolymer rubber, the pellet having a covering layer comprising a thermoplastic resin, (B) 10 to 200 parts by weight of a reinforcing material, and (C) 1 to 200 parts by weight of a softener, thereby producing a rubber composition;

(2) kneading at least said rubber composition, (D) 0.1 to 10 parts by weight of a vulcanizing agent, and (E) 0.05 to 20 parts by weight of a vulcanization accelerator, thereby producing a kneaded product;

(3) molding said kneaded product, thereby producing a molded article of the rubber composition; and (4) heating said molded article.

This process is hereinafter referred to as the process-2.

Further, the present invention is a process for producing a vulcanized and foamed molded article of a rubber composition, which comprises the steps of:

(1) kneading at least (A) 100 parts by weight of a pellet containing an ethylene-α-olefin-non-conjugated diene copolymer rubber, the pellet having a covering layer comprising a thermoplastic resin, (B) 10 to 200 parts by weight of a reinforcing material, and (C) 1 to 200 parts by weight of a softener, thereby producing a rubber composition;

(2) kneading at least said rubber composition, (D) 0.1 to 10 parts by weight of a vulcanizing agent, (E) 0.05 to 20 parts by weight of a vulcanization accelerator, and (F) 0.5 to 20 parts by weight of a foaming agent, thereby producing a kneaded product;

(3) molding said kneaded product, thereby producing a molded article of the rubber composition; and (4) heating said molded article.

This process is hereinafter referred to as the process-3.

The above-mentioned "pellet (A)", "reinforcing material (B)", "softener (C)", "vulcanizing agent (D)", "vulcanization accelerator (E)", and "foaming agent (F)" are hereinafter referred to as "component (A)", "component (B)", "component (C)", "component (D)", "component (E)", and "component (F)", respectively.

DETAILED DESCRIPTION OF THE INVENTION

The "ethylene-α-olefin-non-conjugated diene copolymer rubber" contained in the component (A) means a copolymer rubber containing an ethylene unit, an α-olefin unit having 3 to 10 carbon atoms, and a non-conjugated diene unit having 5 to 20 carbon atoms. A monomer unit such as the above-mentioned ethylene unit means a unit of a polymerized monomer. Examples of said α-olefin are propylene, 1-butene, 1-pentene, 1-hexene, 4-methyl-1-pentene, 1-octene and 1-decene; and a combination of two or more thereof. Among them, preferred is propylene or 1-butene.

Examples of the above-mentioned non-conjugated diene are dicyclopentadiene, ethylidenenorbornene (for example, 5-ethylidene-2-norbornene), and 1,4-hexadiene; and a combination of two or more thereof.

Although an amount of each monomer unit contained in the ethylene-α-olefin-non-conjugated diene copolymer rubber in the process-1 is not limited, an amount of an ethylene unit is usually 20 to 75% by weight, an amount of an α-olefin unit is usually 15 to 60% by weight, and an amount of a non-conjugated diene unit is usually 0.1 to 25% by weight, wherein the total amount of said three units is 100% by weight.

A Mooney viscosity ($ML_{1+4}$, 125° C.) of the ethylene-α-olefin-non-conjugated diene copolymer rubber in the process-1 is preferably 20 to 250.

From a viewpoint of low-temperature flexibility of a vulcanized molded article of a rubber composition, an amount of an ethylene unit contained in the ethylene-α-olefin-non-conjugated diene copolymer rubber in the process-2 is preferably 40 to 70% by weight, and more preferably 45 to 67% by weight; an amount of an α-olefin unit contained therein in the process-2 is preferably 28 to 58% by weight, and more preferably 30 to 52% by weight; and an amount of a non-conjugated diene unit contained therein in the process-2 is preferably 2 to 20% by weight, and more preferably 3 to 10% by weight, wherein the total amount of said three units is 100% by weight. When the amount of an ethylene unit is smaller than 40% by weight, it is difficult to produce an ethylene-α- olefin-non-conjugated diene copolymer rubber having a high molecular weight, and when the amount thereof is larger than 70% by weight, the above-mentioned low-temperature flexibility is deficient. When the amount of a non-conjugated diene unit is smaller than 2% by weight, a vulcanized molded article of a rubber composition is unsatisfactory in its compressive permanent strain, and when the amount thereof is larger than 20% by weight, gels may easily be by-produced in the step (1).

A Mooney viscosity ($ML_{1+4}$, 125° C.) of the ethylene-α-olefin-non-conjugated diene copolymer rubber in the process-2 is preferably 30 to 250. When said Mooney viscosity is smaller than 30 or larger than 250, moldability in the step (3) of the process-2 may be lowered, for example, a poor shape-retaining property in an extrusion-molding method, and a poor flowing property in a die-forming method.

From a viewpoint of low-temperature flexibility of a vulcanized and foamed molded article of a rubber composition, an amount of an ethylene unit contained in the ethylene-α-olefin-non-conjugated diene copolymer rubber in the process-3 is preferably 45 to 60% by weight, and more preferably 48 to 55% by weight; an amount of an α-olefin unit contained therein in the process-3 is preferably 35 to 50% by weight, and more preferably 38 to 45% by weight; and an amount of a non-conjugated diene unit contained therein in the process-3 is preferably 5 to 20% by weight, and more preferably 7 to 15% by weight, wherein the total amount of said three units is 100% by weight. When the amount of an ethylene unit is smaller than 45% by weight, a molecular weight of the ethylene-α-olefin-non-conjugated diene copolymer rubber may not be high enough to produce a vulcanized and foamed molded article having a sufficient strength. When the amount thereof is larger than 60% by weight, the above-mentioned low-temperature flexibility is deficient. When the amount of a non-conjugated diene unit is smaller than 5% by weight, a vulcanized and foamed molded article of a rubber composition is unsatisfactory in its compressive permanent strain, and when the amount thereof is larger than 20% by weight, gels may easily be by-produced in the step (1).

A Mooney viscosity ($ML_{1+4}$, 125° C.) of the ethylene-α-olefin-non-conjugated diene copolymer rubber in the process-3 is preferably 40 to 250. When said Mooney viscosity is smaller than 40 or larger than 250, moldability in the step (3) of the process-3 may be lowered, for example, a poor shape-retaining property in an extrusion-molding method, and a poor flowing property in a die-forming method.

The ethylene-α-olefin-non-conjugated diene copolymer rubber can be produced according to a polymerization method known in the art with the use of a polymerization catalyst known in the art. Examples of the polymerization method are a slurry polymerization method, a solution polymerization method, a bulk polymerization method, and a gas-phase polymerization method. Examples of the polymerization catalyst are a Ziegler-Natta catalyst, and a complex catalyst such as a metallocene complex and a non-metallocene complex.

Examples of the ethylene-α-olefin-non-conjugated diene copolymer rubber are an ethylene-propylene-5-ethylidene-2-norbornene copolymer rubber, an ethylene-propylene-dicyclopentadiene copolymer rubber, and an ethylene-propylene-5-ethylidene-2-norbornene-dicyclopenta-diene copolymer rubber; and a combination thereof. The ethylene-α-olefin-non-conjugated diene copolymer rubber may be a combination of two or more kinds of ethylene-α-olefin-non-conjugated diene copolymer rubbers different from one another regarding an amount of an ethylene unit contained therein, an amount of an α-olefin unit contained therein, or an amount of a non-conjugated diene unit contained therein.

The ethylene-α-olefin-non-conjugated diene copolymer rubber can be combined with other rubber such as a natural rubber; a styrene unit-containing rubber (for example, a styrene-butadiene rubber, a solution-polymerized styrene-butadiene rubber, a styrene-isoprene-styrene block copolymer rubber (SIS), a styrene-butylene-styrene block copolymer rubber (SBS), a styrene-ethylene-butylene-styrene block copolymer rubber (SEBS), and a styrene-ethylene-propylene-styrene block copolymer rubber (SEPS)); a polyisobutylene rubber; a butyl rubber; a butadiene rubber; an isoprene rubber; an alfin rubber; a nitrile rubber; a fluorocarbon rubber; a vinylpyridine rubber; a silicone rubber; a butadiene-methyl methacrylate rubber; an acrylic rubber; and a urethane rubber.

The ethylene-α-olefin-non-conjugated diene copolymer rubber contained in the component (A) can be combined with an antioxidant; a crystal-nucleating agent; an ultraviolet absorber; an antistatic agent; a lubricant; an inorganic filler such as calcium carbonate, talc, mica, silica and carbon black; an antifogging agent; a petroleum resin; a mineral oil; a fiber such as a glass fiber, a natural fiber and a carbon fiber; or a fire retardant.

The thermoplastic resin contained in the component (A) means an elevated-temperature moldable resin, which can repeat reversibly softening by heating and solidification by cooling. Examples of the thermoplastic resin are a crystalline polyolefin resin such as a crystalline polypropylene resin and a crystalline polyethylene resin; a polystyrene resin; a polyamide resin; a polyester resin; a polymethyl methacrylate resin; a polyvinyl alcohol resin; a polycarbonate resin; a polyvinyl chloride resin; and a polyvinylidene chloride resin. Among them, preferred is a crystalline polyolefin resin in view of easy availability and easy pelletizing.

The above-mentioned crystalline polyolefin resin means a crystalline thermoplastic resin containing an olefin unit having 2 to 20 carbon atoms. Examples of the crystalline polyolefin resin are a homopolymer of propylene; a propylene-ethylene copolymer; a propylene-butene-1 copolymer; a propylene-ethylene-butene-1 copolymer; a low-density polyethylene; a medium-density polyethylene; a high-density polyethylene; an ethylene-α-olefin copolymer such as an ethylene-butene-1 copolymer, an ethylene-4-methylpentene-1 copolymer, an ethylene-hexene-1 copolymer, an ethylene-octene-1 copolymer, and an ethylene-decene-1 copolymer; and an ethylene copolymer such as an ethylene-vinyl acetate copolymer and a saponification product of said copolymer. Among them, preferred is a crystalline polyolefin resin having a crystal melting peak at 80 or higher, and preferably at 100° C. or higher measured according to a differential scanning calorimetry (DSC), and more preferred is a low-density polyethylene having a long-chain branch. The above-mentioned crystalline polyolefin resin may be modified by an α, β-unsaturated carboxylic acid such as acrylic acid and methacrylic acid; a fatty acid such as stearic acid; or maleic anhydride. The above-mentioned crystalline polyolefin resin may also be modified by a derivative of any of the above-mentioned acids, such as methyl methacrylate and sodium acrylate.

The above-mentioned crystalline polyolefin resin can be produced according to a polymerization method known in the art with the use of a polymerization catalyst known in the art. Examples of the polymerization method are a slurry polymerization method, a solution polymerization method, a bulk polymerization method, and a gas-phase polymerization method. Examples of the polymerization catalyst are a Ziegler-Natta catalyst, and a complex catalyst such as a metallocene complex and a non-metallocene complex. The crystalline polyolefin resin can also be produced according to a bulk polymerization method or a solution polymerization method known in the art with the use of a radical initiator known in the art.

The above-mentioned thermoplastic resin can be combined with an agent such as an antioxidant, an ultraviolet absorber, an antistatic agent, a pigment, a crystal-nucleating agent, an antifogging agent and a fire retardant.

Examples of a process for producing the component (A) are (1) a process comprising the steps of (i) sticking together each of two films comprising a thermoplastic resin and both sides of a sheet comprising an ethylene-α-olefin-non-conjugated diene copolymer rubber, thereby producing a stuck sheet, and (ii) cutting said stuck sheet with a sheet palletizing machine, thereby producing pellets, wherein the films form covering layers, and (2) a process comprising the steps of (i) multilayer-extrusion molding an ethylene-α-olefin-non-conjugated diene copolymer rubber and a thermoplastic resin, thereby producing a noodle-like string (strand), wherein the ethylene-α-olefin-non-conjugated diene copolymer rubber forms a core layer, and the thermoplastic resin forms a covering layer, and (ii) cutting said strand, thereby producing pellets. Details of those processes are described in US2005/0146075A1.

When the component (A) is a flat plate-like pellet having a quadrangular shape, which can be produced according to the above-mentioned process (1), length of its side is preferably about 2 to about 10 mm. Its thickness is preferably about 0.5 to about 10 mm, and more preferably about 0.8 to about 5 mm. Thickness of the covering layer comprising the thermoplastic resin contained in the component (A) is generally about 1 to about 500 μm, preferably about 5 to about 300 μm, and particularly preferably about 10 to about 100 μm. Examples of the covering layer are a uniaxialy-stretched film, a biaxially-stretched film, and a multilayer film.

When the component (A) is a strand-like pellet, which can be produced according to the above-mentioned process (2), thickness of the covering layer comprising the thermoplastic resin contained in the component (A) is generally about 5 to about 200 μm, and preferably about 40 to about 100 μm. Its cross-sectional surface has a circular form having a diameter of generally about 2 to about 10 mm, and preferably about 3 to about 8 mm, or has an elliptical or polygonal form, each of which forms has the above-mentioned diameter when converted to a circular form.

Since the component (A) has a covering layer comprising a thermoplastic resin, it hardly bonds with one another. In order to further improve its anti-bonding property, the surface of the component (A) may be coated with fine powder such as inorganic fine powder and organic fine powder, or with a liquid anti-bonding agent used in a field of rubber compounding. Examples of the fine powder are calcium carbonate, barium sulfate, silica, talc, calcium stearate, and polyolefin-made fine powder. Examples of the anti-bonding agent are a nonionic surfactant, and an emulsion composed of synthetic wax and a salt of a long-chain fatty acid such as NEW AID DF-30 (trade name) manufactured by Seiko Chemical Co., Ltd.

Examples of the component (B) are carbon black; silica; mica; talc; sodium hydrogen carbonate; and a short fiber-reinforcing material such as carbon fiber and glass fiber.

The component (B) is used in an amount of 10 to 200 parts by weight per 100 parts by weight of the component (A). The component (B) may be combined with the ethylene-α-olefin-non-conjugated diene copolymer rubber contained in the component (A). When the component (B) is combined with said ethylene-α-olefin-non-conjugated diene copolymer rubber, the above-mentioned amount of the component (B) includes an amount of the component (B) contained in said combination, as well as an amount of the component (B) not combined with the ethylene-α-olefin-non-conjugated diene copolymer rubber.

Examples of the component (C) are process oil such as paraffin oil, naphthene oil and aromatic oil; lubricant; paraffin; liquid paraffin; petroleum asphalt; petrolatum; coal tar pitch; caster oil; linseed oil; factice; beeswax; ricinolic acid; palmitic acid; barium stearate; calcium stearate; zinc laurate; atactic polypropylene; and cumarone-indene resin. Among them, particularly preferred is process oil.

The component (C) may be combined with an ethylene-α-olefin-non-conjugated diene copolymer rubber contained in the component (A). Said combination is referred to as an oil-extended rubber or an extended rubber in the present technical field. The amount of the component (C) in the present invention (namely, 1 to 200 parts by weight per 100 parts by weight of the component (A)) includes an amount of the component (C) contained in said combination, as well as an amount of the component (C) not combined with the ethylene-α-olefin-non-conjugated diene copolymer rubber.

Examples of the component (D) are sulfur; a sulfur-donating vulcanizing agent such as 4,4'-dithiodimorpholine, tetramethylthiuram monosulfide and (morpholinedithio)benzothiazole; and an organic peroxide. Examples of the organic peroxide are dicumyl peroxide, 2,5-dimethyl-2,5-di(tert-butylperoxy)hexane, 2,5-dimethyl-2,5-di(benzoylperoxy)hexane, 2,5-dimethyl-2,5-di(tert-butylperoxy)hexyne-3, di-tert-butyl peroxide, di-tert-butylperoxide-3,3,5-trimethylcyclohexane, and tert-butyl hydroperoxide. Among them, particularly preferred is dicumyl peroxide, di-tert-butyl peroxide or di-tert-butylperoxide-3,3,5-trimethylcyclohexane.

The component (D) is used in an amount of generally 0.1 to 10 parts by weight, and preferably 0.2 to 8 parts by weight, per 100 parts by weight of the component (A).

Examples of the component (E) are tetramethylthiuram monosulfide, tetramethylthiuram disulfide, tetraethylthiuram disulfide, tetrabutylthiuram disulfide, dipentamethylenethiuram monosulfide, dipentamethylenethiuram disulfide, dipentamethylenethiuram tetrasulfide, dipentamethylenethiuram hexasulfide, N,N'-dimethyl-N,N'-diphenylthiuram disulfide, N,N'-dioctadecyl-N,N'-diisopropylthiuram disulfide, N-cyclohexyl-2-benzothiazole-sufenamide, N-oxydiethylene-2-benzothiazole-sufenamide, N,N-diisopropyl-2-benzothiazole-sufenamide, 2-mercaptobenzothiazole, 2-(2,4-dinitrophenyl)mercaptobenzothiazole, 2-(2,6-diethyl-4-morpholinothio)benzothiazole, dibenzothiazyl-disulfide, diphenylguanidine, triphenylguanidine, diorthotolylguanidine, orthotolyl-bi-guamide, diphenylguanidine-phthalate, a reaction product of acetaldehyde with aniline, a condensation product of butylaldehyde with aniline, hexamethylenetetramine, 2-mercaptoimidazoline, thiocarbanilide, diethylthiourea, dibutylthiourea, trimethylthiourea, diorthotolylthiourea, zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate, tellurium diethyldithiocarbamate, zinc dibutylxanthate, and ethylenethiourea.

The component (E) is used in an amount of generally 0.05 to 20 parts by weight, and preferably 0.1 to 8 parts by weight, per 100 parts by weight of the component (A).

Examples of the component (F) are an inorganic foaming agent such as sodium hydrogen carbonate, sodium carbonate, ammonium hydrogen carbonate, ammonium carbonate, and ammonium nitrite; an organic foaming agent such as N,N'-dimethyl-N,N'-dinitroso-telephthalamide, N,N'-dinitroso-pentamethylene-tetramine, azodicarbonamide, azobisisobutyronitrile, azocyclohexylnitrile, azodiaminobenzene, barium azodicarboxylate, benzenesulfonyl hydrazide, toluenesulfonyl hydrazide, toluenesulfonyl hydrazide derivatives, p-toluenesulfonyl semicarbazide, 4,4'-oxybis(benzenesulfonyl hydrazide), diphenylsulfone-3,3'-disulfonyl hydrazide, calcium azide, 4,4'-diphenyl-disulfonyl azide, p-toluenesulfonyl azide, p-toluenesulfonyl acetonehydrazone and hydrazodicarbonamide; and a combination of two or more thereof. Among them, preferred is 4,4'-oxybis(benzenesulfonyl hydrazide) in order to obtain a stable expansion ratio.

The component (F) is used in an amount of generally 0.5 to 20 parts by weight, per 100 parts by weight of the component (A).

Any of the components (A) to (F) may be combined with a processing material in order to (i) improve dispersibility of said components, (ii) improve flowability of the kneaded product produced in the step (2) of the process-2 or the process-3, (iii) improve releasability of the molded article produced in the step (3) of the process-2 or the process-3 from a mold, or (iv) dehydrate the kneaded product produced in the step (2) of the process-2 or the process-3 to produce a molded having an excellent appearance. Examples of the processing material are a fatty acid such as a saturated fatty acid and an unsaturated fatty acid; an ester of a fatty acid such as an ester of a saturated fatty acid and an ester of an unsaturated fatty acid; a metal salt of a fatty acid such as a metal salt of a saturated fatty acid and a metal salt of an unsaturated fatty acid; a mixture of the above-mentioned ester of a fatty acid with the above-mentioned metal salt of a fatty acid; a metal oxide such as zinc oxide and calcium oxide; wax; and organosilicone oil. For example, stearic acid or zinc oxide can be used in order to improve dispersibility; a mixture of a calcium salt of a saturated fatty acid with an ester of a saturated fatty acid, STRUCTOL WB16 (trade name) manufactured by Structol Co. Ltd., can be used in order to improve flowability; and calcium oxide can be used in order to dehydrate the kneaded product. The processing material is used in an amount of generally 0.5 to 15 parts by weight, per 100 parts by weight of the ethylene-α-olefin-non-conjugated diene copolymer rubber contained in the component (A).

Examples of a preferable apparatus used in the step of the process-1, the step (1) of the process-2, and the step (1) of the process-3 are an airtight mixer such as a Banbury mixer; and an extruder such as a uniaxial-screw extruder, a twin-screw extruder having two screws rotating in the same direction, a twin-screw extruder having two screws rotating in different directions from each other, and a twin-screw extruder equipped with a multistage mixing zone.

Examples of a preferable apparatus used in the step (2) of the process-2, and in the step (2) of the process-3 are an open roll and a kneader.

Examples of a preferable apparatus used in the steps (3) and (4) of the process-2, and in those steps of the process-3 are a press-molding machine, an injection-molding machine, and a transfer-molding machine, each of which performs the steps (3) and (4) at the same time; an extrusion-molding machine and a calendar-molding machine, each of which performs only the step (3); and a batch-wise vulcanizing apparatus such as a can-type vulcanizing apparatus, and a continuous vulcanizing apparatus such as a hot-air vulcanizing apparatus, a salt-bath vulcanizing apparatus, a fluidized-bed vulcanizing apparatus, and a high-frequency vulcanizing apparatus, each of which performs only the step (4).

While a method known in the art for supplying a rubber component to a kneading apparatus such as an extruder comprises the steps of:

(1) cutting a bale-shaped rubber to predetermined size-having pieces, which bond easily with one another;

(2) weighing the pieces on a scale; and (3) supplying the weighed pieces to an airtight mixer or an extruder, which is a troublesome method, the present invention has the following merits (i) to (iii):

(i) since the component (A) as a rubber component has a pellet shape, the component (A) itself can be supplied to an airtight mixer or an extruder;

(ii) since the component (A) as a rubber component does not bond easily with one another, the component (A) can be weighed easily; and (iii) the component (A) supplied to an extruder can reach a barrel thereof smoothly without its blockage in a supply port and/or a hopper.

Each of the vulcanized molded article of a rubber composition produced according to the process-2, and the vulcanized and foamed molded article of a rubber composition produced according to the process-3 has various uses such as automobile parts, parts of home electric appliances, cases for documents, various kinds of mats, stationery, miscellaneous daily goods, medical devices, food containers, and fibers.

EXAMPLE

The present invention is explained with reference to the following Examples, which do not limit the scope of the present invention.

Example 1

Regarding Process-1 and Process-2

(1) Production of Component (A)

There was press-molded an ethylene-propylene-5-ethylidene-2-norbornene-dicyclopenta-diene copolymer rubber (non-extended rubber) at 150° C., thereby making a sheet having a size of 150 mm×150 mm×3 mm (thickness), the copolymer rubber (i) having a trade name of ESPRENE and a grade name of 5527F manufactured by Sumitomo Chemical Co., Ltd., (ii) containing an ethylene unit in an amount of 54.0% by weight, a propylene unit in an amount of 37.5% by weight, and a 5-ethylidene-2-norbornene unit and a dicyclopentadiene unit in a total amount of 8.5% by weight, and (iii) having a Mooney viscosity ($ML_{1+4}$, 125° C.) of 130.

There was overlapped each of two inflation films onto both sides of said sheet, and the overlapped material was press-molded at 110° C., thereby making a stuck sheet, each of the films (i) having thickness of 40 μm, and (ii) being made from a long chain branch-containing low density polyethylene (LDPE) having a grade name of V-SERIES STF manufactured by Tamapoly Co., Ltd.

Said stuck sheet was cut with a conventional sheet pelletizing machine, thereby producing cubic pellets having a size of 10 mm×7 mm×3 mm (thickness).

Said pellets were dipped in a 7-fold diluted solution of a liquid anti-bonding agent having a trade name of NEW AID DF-30 manufactured by Seiko Chemical Co., Ltd., thereby producing pellets (component (A)) coated with the anti-bonding agent. Said pellets were very good in their mutually anti-bonding property. The component (A) contained LDPE in an amount of 2% by weight, the total amount of the component (A) being 100% by weight.

(2) Production of Rubber Composition

There were kneaded 100 parts by weight of the component (A) produced in the above (1), 100 parts by weight of carbon black (component (B)) having a trade name of CARBON BLACK ASAHI 50HG manufactured by ASAHI CARBON Co., Ltd., 80 parts by weight of oil (component (C)) having a trade name of PROCESS OIL PS430 manufactured by Idemitsu Kosan Co., Ltd., 30 parts by weight of calcium carbonate, 7 parts by weight of zinc oxide, 1 (one) part by weight of stearic acid, and 2 parts by weight of a processing material having a trade name of STRUCTOL WB16 manufactured by Structol Co. Ltd., with a Banbury mixer having a 600 milliliter inner volume, thereby producing a rubber composition.

(3) Production of Kneaded Product

There were kneaded the total amount of the above-produced rubber composition, 2 parts by weight of calcium oxide, 0.7 part by weight of sulfur (component (D)), 0.875 part by weight of 4,4'-dithiodimorpholine (component (D)) having a trade name of NOCMASTER R80E manufacture by Bayer, 2.5 parts by weight of 2-mercaptobenzothiazole (component (E)) having a trade name of RHENOGRAN MBT80 manufacture by Bayer, 0.4 part by weight of tellurium diethyldithiocarbamate (component (E)) having a trade name of RHENOGRAN TDEC75 manufacture by Bayer, 0.625 part by weight of zinc di-n-butyldithiocarbamate (component (E)) having a trade name of RHENOGRAN ZDBC80 manufacture by Bayer, and 1.875 parts by weight of zinc dimethyldithiocarbamate (component (E)) having a trade name of RHENOGRAN ZDMC80 manufacture by Bayer, with a 6 inch-open roll, thereby producing a kneaded product.

(4) Production of Molded Article of Rubber Composition, and Heating said Molded Article The above-produced kneaded product was molded at 160° C. for 25 minutes with a press-molding machine, thereby producing a column-shaped vulcanized molded article of the rubber composition having a diameter of 29 mm and thickness (height) of 12.5 mm. Said molded article had a compressive permanent strain of 21%.

Results are shown in Table 1, wherein respective figures regarding the components are amounts thereof (part by weight) used in respective Examples or Comparative Examples.

The above-mentioned mutually anti-bonding property of the pellets was evaluated according to a method comprising the steps of:

(1) setting 100 g of pellets in an ethylene tetrafluoride resin-made 500 ml-beaker;

(2) putting a column-shaped 2 kg-weight over the pellets;

(3) leaving it for 24 hours at 40° C.;

(4) taking the weight off;

(5) inclining the beaker to take the pellets out of the beaker; and (6) evaluating a mutually anti-bonding property according to the following criteria (i) to (iv):

(i) when no mutual bonding is observed, the mutually anti-bonding property is very good;

(ii) when pellets can be taken out of the beaker, however some pellets bond mutually to form some small masses, the mutually anti-bonding property is good;

(iii) when the pellets bond mutually to form a mass, and said mass can be broken up into respective pellets under week push with a finger, the mutually anti-bonding property is bad; and (iv) when the pellets bond mutually to form a mass, and said mass can be broken up into respective pellets under strong push with a finger, the mutually anti-bonding property is very bad.

The above-mentioned compressive permanent strain was measured based on JIS K6262 ("JIS" means Japanese Industrial Standards) according to a method comprising the steps of:

(1) placing a column-shaped vulcanized molded article of a rubber composition having a diameter of 29 mm and thickness ($T_0$) of 12.5 mm produced in Example 1 (4), together with a metal-made spacer having thickness ($T_1$) of 9.4 mm, in a compression equipment defined in JIS K6262;

(2) heating the compression equipment in an oven at 70° C. for 72 hours;

(3) taking the molded article quickly out of the compression equipment;

(4) leaving the molded article at a room temperature for 30 minutes;

(5) measuring thickness ($T_2$) of the molded article; and (6) obtaining its compressive permanent strain from the following formula:

$$\text{compressive permanent strain } (\%) = 100 \times (T_0 - T_2)/(T_0 - T_1).$$

Example 2

Regarding Process-1 and Process-2

Example 1 was repeated except that the thickness (40 µm) of the films used in Example 1 (1) was changed to 75 µm. The produced pellets were very good in their mutually anti-bonding property. The pellets contained LDPE in an amount of 3.75% by weight, the total amount of the pellets being 100% by weight. Results are shown in Table 1.

Example 3

Regarding Process-1 and Process-2

Example 1 was repeated except that the thickness (40 µm) of the films used in Example 1 (1) was changed to 150 µm. The produced pellets were very good in their mutually anti-bonding property. The pellets contained LDPE in an amount of 7.5% by weight, the total amount of the pellets being 100% by weight. Results are shown in Table 1.

Comparative Example 1

There were mixed 95 parts by weight of ESPRENE 5527F and 5 parts by weight of a long chain branch-containing low density polyethylene having a grade name of G202 manufactured by Sumitomo Chemical Co., Ltd. with a Banbury mixer, thereby producing a mixture.

Said mixture was pelletized with an extruder having an in-water cutting system pelletizer, and the produced pellets were coated with an anti-bonding agent according to the same method as that carried out in Example 1 (1). The so-coated pellets were very bad in their mutually anti-bonding property. The pellets contained LDPE in an amount of 5% by weight, the total amount of the pellets being 100% by weight.

Example 1 was repeated except that the component (A) was changed to the so-coated pellets.

Results are shown in Table 1.

Comparative Example 2

Comparative Example 1 was repeated except that (i) an amount of ESPRENE 5527F was changed to 90 parts by weight, and (ii) an amount of the long chain branch-containing low density polyethylene was changed to 10 parts by weight. The produced pellets were very bad in their mutually anti-bonding property. The pellets contained LDPE in an amount of 10% by weight, the total amount of the pellets being 100% by weight. Results are shown in Table 1.

Comparative Example 3

Comparative Example 1 was repeated except that (i) an amount of ESPRENE 5527F was changed to 75 parts by weight, and (ii) an amount of the long chain branch-containing low density polyethylene was changed to 25 parts by weight. The produced pellets were good in their mutually anti-bonding property. The pellets contained LDPE in an amount of 25% by weight, the total amount of the pellets being 100% by weight. Results are shown in Table 1.

Example 4

Regarding Process-1 and Process-2

(1) Production of Component (A)

There was press-molded an ethylene-propylene-dicyclopentadiene copolymer rubber (non-extended rubber) at 150° C., thereby making a sheet having a size of 150 mm×150 mm×3 mm (thickness), the copolymer rubber (i) having a trade name of ESPRENE and a grade name of 301A manufactured by Sumitomo Chemical Co., Ltd., (ii) containing an ethylene unit in an amount of 50% by weight, a propylene unit in an amount of 45% by weight, and a dicyclopentadiene unit in an amount of 5.0% by weight, and (iii) having a Mooney viscosity ($ML_{1+4}$, 125° C.) of 32.

There was overlapped each of two inflation films onto both sides of said sheet, and the overlapped material was press-molded at 110° C., thereby making a stuck sheet, each of the films (i) having thickness of 75 μm, and (ii) being made from a long chain branch-containing low density polyethylene (LDPE) having a grade name of V-SERIES STF manufactured by Tamapoly Co., Ltd.

Said stuck sheet was cut with a conventional sheet pelletizing machine, thereby producing cubic pellets having a size of 10 mm×7 mm×3 mm (thickness).

Said pellets were dipped in a 7-fold diluted solution of a liquid anti-bonding agent having a trade name of NEW AID DF-30 manufactured by Seiko Chemical Co., Ltd., thereby producing pellets (component (A)) coated with the anti-bonding agent. Said pellets were very good in their mutually anti-bonding property. Said pellets contained LDPE in an amount of 3.75% by weight, the total amount of the pellets being 100% by weight.

(2) Production of Rubber Composition

There were kneaded 100 parts by weight of the component (A) produced in the above (1), 100 parts by weight of carbon black (component (B)) having a trade name of CARBON BLACK SEAST G-SO manufactured by TOKAI CARBON Co., Ltd., 60 parts by weight of oil (component (C)) having a trade name of PROCESS OIL PW90 manufactured by Idemitsu Kosan Co., Ltd., 5 parts by weight of zinc oxide, and 1 (one) part by weight of stearic acid, with a Banbury mixer having a 1.7 liter inner volume, thereby producing a rubber composition.

(3) Production of Kneaded Product

There were kneaded the total amount of the above-produced rubber composition, 1.5 parts by weight of sulfur (component (D)), 1.25 parts by weight of 2-mercaptobenzothiazole (component (E)) having a trade name of RHENOGRAN MBT80 manufacture by Bayer, 2.5 parts by weight of zinc di-n-butyldithiocarbamate (component (E)) having a trade name of RHENOGRAN ZDBC80 manufacture by Bayer, 0.625 part by weight of tetramethylthiuram disulfide (component (E)) having a trade name of RHENOGRAN TMTD80 manufacture by Bayer, and 0.714 part by weight of dipentamethylenethiuram hexasulfide (component (E)) having a trade name of RHENOGRAN DPTT70 manufacture by Bayer, with a 10 inch-open roll, thereby producing a kneaded product.

(4) Production of Molded Article of Rubber Composition, and Heating Said Molded Article The above-produced kneaded product was molded at 170° C. for 21 minutes with a press-molding machine, thereby producing a column-shaped vulcanized molded article of the rubber composition having a diameter of 29 mm and thickness (height) of 12.5 mm. Said molded article had a compressive permanent strain of 48% (70° C./72 hours) and 75% (−20° C./22 hours).

Results are shown in Table 2.

The above-mentioned compressive permanent strain was measured based on JIS K6262 according to a method comprising the steps of:

(1) placing a column-shaped vulcanized molded article of a rubber composition having a diameter of 29 mm and thickness ($T_0$) of 12.5 mm produced in Example 1 (4), together with a metal-made spacer having thickness ($T_1$) of 9.4 mm, in a compression equipment defined in JIS K6262;

(2) heating the compression equipment in an oven at 70° for 72 hours or at −20% for 22 hours;

(3) taking the molded article quickly out of the compression equipment;

(4) leaving the molded article at a room temperature for 30 minutes;

(5) measuring thickness ($T_2$) of the molded article; and (6) obtaining its compressive permanent strain from the following formula:

$$\text{compressive permanent strain (\%)} = 100 \times (T_0 - T_2)/(T_0 - T_1)$$

Example 5

Regarding Process-1 and Process-2

Example 4 was repeated except that (1) the ethylene-propylene-dicyclopentadiene copolymer rubber was changed to an ethylene-propylene-5-ethylidene-2-norbornene-dicyclopenta-diene copolymer rubber (non-extended rubber) (i) having a trade name of ESPRENE and a grade name of 522 manufactured by Sumitomo Chemical Co., Ltd., (ii) containing an ethylene unit in an amount of 56% by weight, a propylene unit in an amount of 39% by weight, and a 5-ethylidene-2-norbornene unit and a dicyclopentadiene unit in a total amount of 5.0% by weight, and (iii) having a Mooney viscosity ($ML_{1+4}$, 125° C.) of 43, and (2) the molding time of 21 minutes at 170° C. was changed to 13 minutes. The produced pellets were very good in their mutually anti-bonding property. Said pellets contained LDPE in an amount of 3.75% by weight, the total amount of the pellets being 100% by weight. Results are shown in Table 2.

Comparative Example 4

Comparative Example 1 was repeated except that (1) 95 parts by weight of ESPRENE 5527F was changed to 75 parts by weight of ESPRENE 301A, and (2) 5 parts by weight of the long chain branch-containing low density polyethylene was changed to 25 parts by weight thereof, thereby producing pellets coated with an anti-bonding agent. Said pellets were good in their mutually anti-bonding property. Said pellets contained LDPE in an amount of 25% by weight, the total amount of the pellets being 100% by weight.

Example 4 was repeated except that the component (A) was changed to the so-coated pellets.

Results are shown in Table 2.

Comparative Example 5

Comparative Example 1 was repeated except that (1) 95 parts by weight of ESPRENE 5527F was changed to 75 parts by weight of ESPRENE 522, and (2) 5 parts by weight of the long chain branch-containing low density polyethylene was changed to 25 parts by weight thereof, thereby producing pellets coated with an anti-bonding agent. Said pellets were good in their mutually anti-bonding property. Said pellets contained LDPE in an amount of 25% by weight, the total amount of the pellets being 100% by weight.

Example 4 was repeated except that the component (A) was changed to the so-coated pellets.

Results are shown in Table 2.

Example 6

Regarding Process-1 and Process-3

(1) Production of Component (A)

Example 4 was repeated except that the ethylene-propylene-dicyclopentadiene copolymer rubber (non-extended rubber) was change to an ethylene-propylene-5-ethylidene-2-norbornene copolymer rubber (oil-extended rubber) (i) having a trade name of ESPRENE and a grade name of 7456 manufactured by Sumitomo Chemical Co., Ltd., (ii) containing an ethylene unit in an amount of 53% by weight, a propylene unit in an amount of 37% by weight, and a 5-ethylidene-2-norbornene unit in an amount of 10% by weight, (iii) having a Mooney viscosity ($ML_{1+4}$, 125° C.) of 97, and (iv) containing 20 parts by weight of an extender oil per 100 parts by weight of the ethylene-propylene-5-ethylidene-2-norbornene copolymer rubber, thereby producing pellets (component (A)+component (C)) coated with the anti-bonding agent, and containing the extender oil. Said pellets were very good in their mutually anti-bonding property. Said pellets contained LDPE in an amount of 3.75% by weight, the total amount of the pellets being 100% by weight, and contained the extender oil (component (C)) in an amount of 19 parts by weight, the total amount of the pellets being 119 parts by weight.

(2) Production of Rubber Composition

There were kneaded 119 parts by weight of the pellets produced in the above (1), 100 parts by weight of carbon black (component (B)) having a trade name of CARBON BLACK ASAHI 50HG manufactured by ASAHI CARBON Co., Ltd., 61 parts by weight of oil (component (C)) having a trade name of PROCESS OIL PS430 manufactured by Idemitsu Kosan Co., Ltd., 30 parts by weight of calcium carbonate, 7 parts by weight of zinc oxide, 1 (one) part by weight of stearic acid, and 2 parts by weight of a processing material having a trade name of STRUCTOL WB16 manufactured by Structol Co. Ltd., with a Banbury mixer having a 1.7 liter inner volume, thereby producing a rubber composition.

(3) Production of Kneaded Product

There were kneaded the total amount of the above-produced rubber composition, 2 parts by weight of calcium oxide, 0.7 part by weight of sulfur (component (D)), 0.875 part by weight of 4,4'-dithiodimorpholine (component (D)) having a trade name of NOCMASTER R80E manufacture by Bayer, 2.5 parts by weight of 2-mercaptobenzothiazole (component (E)) having a trade name of RHENOGRAN MBT80 manufacture by Bayer, 0.4 part by weight of tellurium diethyldithiocarbamate (component (E)) having a trade name of RHENOGRAN TDEC75 manufacture by Bayer, 0.625 part by weight of zinc di-n-butyldithiocarbamate (component (E)) having a trade name of RHENOGRAN ZDBC80 manufacture by Bayer, 1.875 parts by weight of zinc dimethyldithiocarbamate (component (E)) having a trade name of RHENOGRAN ZDMC80 manufacture by Bayer, and 3 parts by weight of 4,4'-oxybis(benzenesulfonyl hydrazide) (component (F)) having a trade name of NEOSELLBORN N1000S manufacture by Eiwa Chemical Ind. Co., Ltd., with a 10 inch-open roll, thereby producing a kneaded product.

(4) Production of Molded Article of Rubber Composition, and Heating Said Molded Article The above-produced kneaded product was extruded with a 45 mm diameter-having extruder equipped with a tube-like die having an inner diameter of 10 mm, and a wall thickness of 1.2 mm, and therefore, an outer diameter of 12.4 mm, at a die temperature of 80° C. and a cylinder temperature of 60° C., thereby producing a molded article having a tube-like shape. Said article was heated at 220° C. for 10 minutes in a hot air-typed vulcanizing apparatus, thereby a producing a vulcanized and foamed molded article of the rubber composition. Said vulcanized and foamed molded article had a density of 0.6 g/cm$^3$, and a compressive permanent strain of 25%.

Results are shown in Table 3.

The above-mentioned density was measured using a wire as a hanging device according to a water displacement method comprising the steps of:

(1) measuring a weight (m) of a 50 mm length-having vulcanized and foamed molded article in an air atmosphere;

(2) hanging said vulcanized and foamed molded article at the end of a hanging device;

(3) measuring a weight (M) of said vulcanized and foamed molded article in water; and (4) obtaining its density from the formula, density=m/M.

The above-mentioned compressive permanent strain was measured based on JIS K6262 according to a method comprising the steps of:

(1) measuring an outer diameter ($T_0$) of a 30 mm length-having vulcanized and foamed molded article;

(2) regulating thickness ($T_1$) of a metal-made spacer so that said molded article is compressed with the spacer in its diameter direction so as to have a thickness of $T_0/2$, and placing the same in a compression equipment defined in JIS K6262;

(3) heating the compression equipment in an oven at 70° C. for 22 hours;

(3) taking said molded article quickly out of the compression equipment;

(4) leaving said molded article at a room temperature for 30 minutes;
(5) measuring thickness ($T_2$) of the molded article; and
(6) obtaining its compressive permanent strain from the following formula, $$\text{compressive permanent strain (\%)} = 100 \times (T_0 - T_2)/(T_0 - T_1).$$

Example 7

Regarding Process-1 and Process-3

(1) Production of Component (A)

Example 6 was repeated except that the ethylene-propylene-5-ethylidene-2-norbornene copolymer rubber was changed to an ethylene-propylene-5-ethylidene-2-norbornene-dicyclopenta-diene copolymer rubber (non-extended rubber) (i) having a trade name of ESPRENE and a grade name of 555 manufactured by Sumitomo Chemical Co., Ltd., (ii) containing an ethylene unit in an amount of 50% by weight, a propylene unit in an amount of 41% by weight, and a 5-ethylidene-2-norbornene unit and a dicyclopentadiene unit in a total amount of 9.0% by weight, and (iii) having a Mooney viscosity ($ML_{1+4}$, 125° C.) of 85. The produced pellets were very good in their mutually anti-bonding property. Said pellets contained LDPE in an amount of 3.75% by weight, the total amount of the pellets being 100% by weight.

(2) Production of Rubber Composition, Production of Kneaded Product, Production of Molded Article of Rubber Composition, and Heating Said Molded Article Example 6 was repeated except that (1) 119 parts by weight of the pellets used in Example 6 was changed to 100 parts by weight of the above-produced pellets, and (2) 61 parts by weight of oil (component (C)) used in Example 6 was changed to 80 parts by weight of said oil.

Results are shown in Table 3.

Comparative Example 6

Comparative Example 1 was repeated except that (1) 95 parts by weight of ESPRENE 5527F was changed to 75 parts by weight of ESPRENE 7456, (2) and 5 parts by weight of the long chain branch-containing low density polyethylene was changed to 25 parts by weight thereof, thereby producing pellets coated with an anti-bonding agent. Said pellets were good in their mutually anti-bonding property. Said pellets contained LDPE in an amount of 25% by weight, the total amount of the pellets being 100% by weight, and contained the extender oil (component (C)) in an amount of 14.3 parts by weight, the total amount of the pellets being 114.3 parts by weight.

Example 6 was repeated except that (1) 119 parts by weight of the pellets used in Example 6 was changed to 114.3 parts by weight of the above-produced pellets, and (2) 61 parts by weight of oil (component (C)) used in Example 6 was changed to 65.7 parts by weight of said oil.

Results are shown in Table 3.

Comparative Example 7

Comparative Example 1 was repeated except that (1) 95 parts by weight of ESPRENE 5527F was changed to 75 parts by weight of ESPRENE 555, and (2) 5 parts by weight of the long chain branch-containing low density polyethylene was changed to 25 parts by weight thereof, thereby producing pellets coated with an anti-bonding agent. Said pellets were good in their mutually anti-bonding property. Said pellets contained LDPE in an amount of 25% by weight, the total amount of the pellets being 100% by weight.

Example 6 was repeated except that 119 parts by weight of the pellets used in Example 6 was changed to 100 parts by weight of the above-produced pellets.

Results are shown in Table 3.

The above Example shows the following:

Regarding Table 1

(1) Examples give pellets having very good or good mutually anti-bonding property by use of a smaller amount of the thermoplastic resin than that in Comparative Examples, and (2) Examples give a vulcanized molded article of rubber composition having superior compressive permanent strain to those in Comparative Examples;

Regarding Table 2

(1) even when using an ethylene-α-olefin-non-conjugated diene copolymer rubber having a different composition from that used in Table 1, there is provided pellets having very good or good mutually anti-bonding property, and (2) Examples give a vulcanized molded article of rubber composition having excellent compressive permanent strain;

Regarding Table 3

(1) although Examples 6 and 7 and Comparative Examples 6 and 7 have the same density as each other, Examples give a vulcanized and foamed molded article of rubber composition having superior compressive permanent strain to those in Comparative Examples.

TABLE 1

| | Example | | | Comparative Example | | |
|---|---|---|---|---|---|---|
| | 1 | 2 | 3 | 1 | 2 | 3 |
| Component (A) | | | | | | |
| (1) Rubber pellet covered with thermoplastic resin film | | | | | | |
| (1-1) with 40 micron m-thick film [rubber/resin = 98/2 (weight)] | 100 | | | | | |
| (1-2) with 75 micron m-thick film [rubber/resin = 96.25/3.75 (weight)] | | 100 | | | | |
| (1-3) with 150 micron m-thick film [rubber/resin = 92.5/7.5 (weight)] | | | 100 | | | |

TABLE 1-continued

|  | Example | | | Comparative Example | | |
|---|---|---|---|---|---|---|
|  | 1 | 2 | 3 | 1 | 2 | 3 |
| (2) Pellet containing mixture of rubber and thermoplastic resin | | | | | | |
| (2-1) rubber/resin = 95/5 (weight) |  |  |  | 100 |  |  |
| (2-2) rubber/resin = 90/10 (weight) |  |  |  |  | 100 |  |
| (2-3) rubber/resin = 75/25 (weight) |  |  |  |  |  | 100 |
| Component (B): reinforcing material | 100 | 100 | 100 | 100 | 100 | 100 |
| Component (C): softener | 80 | 80 | 80 | 80 | 80 | 80 |
| Component (D): vulcanizing agent | 1.575 | 1.575 | 1.575 | 1.575 | 1.575 | 1.575 |
| Component (E): vulcanization accelerator | 5.4 | 5.4 | 5.4 | 5.4 | 5.4 | 5.4 |
| Vulcanized molded article of rubber composition | | | | | | |
| Compressive permanent strain (%) | 21 | 21 | 23 | 22 | 25 | 31 |

TABLE 2

|  | Example | | Comparative Example | |
|---|---|---|---|---|
|  | 4 | 5 | 4 | 5 |
| Component (A) | | | | |
| (1) Use of ESPRENE | | | | |
| (1-1) 301A | 100 |  |  |  |
| (1-2) 522 |  | 100 |  |  |
| (2) Pellet containing mixture of rubber and thermoplastic resin rubber/resin = 75/25 (weight) | | | | |
| (2-1) Use of ESPRENE 301A |  |  | 100 |  |
| (2-2) Use of ESPRENE 522 |  |  |  | 100 |
| Component (B): reinforcing material | 100 | 100 | 100 | 100 |
| Component (C): softener | 60 | 60 | 60 | 60 |
| Component (D): vulcanizing agent | 1.5 | 1.5 | 1.5 | 1.5 |
| Component (E): vulcanization accelerator | 5.089 | 5.089 | 5.089 | 5.089 |
| Vulcanized molded article of rubber composition | | | | |
| Compressive permanent strain (%) | | | | |
| +70° C./72 hours | 48 | 32 | 62 | 46 |
| −20° C./22 hours | 75 | 73 | 86 | 82 |

TABLE 3

|  | Example | | Comparative Example | |
|---|---|---|---|---|
|  | 6 | 7 | 6 | 7 |
| Component (A) | | | | |
| (1) Use of ESPRENE | | | | |
| (1-1) 7456 | 119 (Note-1) |  |  |  |
| (1-2) 555 |  | 100 |  |  |
| (2) Pellet containing mixture of rubber and thermoplastic resin rubber/resin = 75/25 (weight) | | | | |
| (2-1) Use of ESPRENE 7456 |  |  | 114.3 (Note-2) |  |
| (2-2) Use of ESPRENE 555 |  |  |  | 100 |
| Component (B): reinforcing material | 100 | 100 | 100 | 100 |
| Component (C): softener | 61 | 80 | 65.7 | 80 |
| Component (D): vulcanizing agent | 1.575 | 1.575 | 1.575 | 1.575 |
| Component (E): vulcanization accelerator | 5.4 | 5.4 | 5.4 | 5.4 |
| Component (F): foaming agent | 3 | 3 | 3 | 3 |
| Vulcanized and foamed molded article of rubber composition | | | | |
| Density (g/cm³) | 0.6 | 0.5 | 0.6 | 0.5 |
| Compressive permanent strain (%) | 25 | 28 | 33 | 34 |

(Note-1): Said 119 parts by weight consists of 100 parts by weight of the component (A) and 19 parts by weight of the component (C).
(Note-1): Said 114.3 parts by weight consists of 100 parts by weight of the component (A) and 14.3 parts by weight of the component (C).

The invention claimed is:

1. A process for producing a vulcanized and foamed molded article of a rubber composition, which comprises the steps of:
    (1) kneading at least (A) 100 parts by weight of a pellet containing an ethylene-α-olefin-non-conjugated diene copolymer rubber, the pellet having a covering layer comprising a thermoplastic resin, (B) 10 to 200 parts by weight of a reinforcing material, and (C) 1 to 200 parts by weight of a softener, thereby producing a rubber composition;
    (2) kneading at least said rubber composition, (D) 0.1 to 10 parts by weight of a vulcanizing agent, (E) 0.05 to 20 parts by weight of a vulcanization accelerator, and (F) 0.5 to 20 parts by weight of a foaming agent, thereby producing a kneaded product;

(3) molding said kneaded product, thereby producing a molded article of the rubber composition; and (4) heating said molded article, wherein the ethylene-α-olefin-non-conjugated diene copolymer rubber has a Mooney viscosity ($ML_{1+4}$ 125° C.) of 85 to 250, and wherein the ethylene-α-olefin-non-conjugated diene copolymer rubber contains an ethylene unit in an amount of 45 to 60% by weight, an α-olefin unit in an amount of 35 to 50% by weight, and a non-conjugated diene unit in an amount of 5 to 20% by weight, wherein the total amount of said three units is 100% by weight.

2. The process for producing a vulcanized and foamed molded article of a rubber composition according to claim 1, wherein the foaming agent is 4,4'-oxybis(benzenesulfonyl hydrazide).

* * * * *